United States Patent
Heinrich et al.

(10) Patent No.: US 11,513,029 B2
(45) Date of Patent: Nov. 29, 2022

(54) MOVING FLYING OBJECT FOR SCANNING AN OBJECT, AND SYSTEM FOR ANALYZING DAMAGE TO THE OBJECT

(71) Applicant: SIEMENS AKTIENGESELLSCHAFT, Munich (DE)

(72) Inventors: Christoph Heinrich, Donauwörth (DE); Harald Held, Bockhorn (DE); Benjamin Lee, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1071 days.

(21) Appl. No.: 16/095,976

(22) PCT Filed: Apr. 13, 2017

(86) PCT No.: PCT/EP2017/058993
§ 371 (c)(1),
(2) Date: Oct. 24, 2018

(87) PCT Pub. No.: WO2017/186515
PCT Pub. Date: Nov. 2, 2017

(65) Prior Publication Data
US 2019/0128772 A1    May 2, 2019

(30) Foreign Application Priority Data
Apr. 25, 2016 (DE) ...................... 10 2016 206 982.9

(51) Int. Cl.
B64C 39/02    (2006.01)
H04N 13/00   (2018.01)
(Continued)

(52) U.S. Cl.
CPC ......... G01M 5/0075 (2013.01); B64C 39/024 (2013.01); G01B 11/2513 (2013.01);
(Continued)

(58) Field of Classification Search
CPC ............. G01M 5/0075; G01M 5/0091; G01M 11/081; B64C 39/024; B64C 2201/042;
(Continued)

(56) References Cited

U.S. PATENT DOCUMENTS 6,025,790 A      2/2000  Saneyoshi
8,872,818 B2 *  10/2014  Freeman ............... H04N 13/254
                                                    345/419
(Continued)

FOREIGN PATENT DOCUMENTS

DE    102005020594         11/2006
DE    102005020594 A1      11/2006
(Continued)

OTHER PUBLICATIONS

International Search Report for PCT Application No. PCT/EP2017/058993.
(Continued)

Primary Examiner — Tung T Vo
(74) Attorney, Agent, or Firm — Schmeiser, Olsen & Watts LLP

(57) ABSTRACT

An aircraft that includes a helicopter drone on which a 3D scanner is mounted via an actively rotatable joint is provided. The 3D scanner has at least one high-resolution camera for recording a multiplicity of overlapping images of the object from different recording positions and recording directions, so that comparison of the images allows a position and orientation of the 3D scanner relative to the object to be ascertained. In addition, the aircraft has a coordination device for coordinated control of the 3D scanner, the joint
(Continued)

and the helicopter drone. The system for damage analysis has an aircraft and an image processing module generating a data representation of a surface profile of the object on the basis of the recorded images. In addition, the system includes a rating device for checking the surface profile and for outputting a damage statement on the basis of the check.

7 Claims, 2 Drawing Sheets

(51) Int. Cl.
  *G01M 5/00* (2006.01)
  *G01M 11/08* (2006.01)
  *G05D 1/00* (2006.01)
  *G01B 11/25* (2006.01)

(52) U.S. Cl.
  CPC ....... *G01B 11/2545* (2013.01); *G01M 5/0091* (2013.01); *G01M 11/081* (2013.01); *G05D 1/0094* (2013.01); *H04N 13/00* (2013.01); *B64C 2201/042* (2013.01); *B64C 2201/108* (2013.01); *B64C 2201/123* (2013.01); *B64C 2201/127* (2013.01)

(58) Field of Classification Search
  CPC ........ B64C 2201/108; B64C 2201/123; B64C 2201/127; B64C 2201/027; G01B 11/2513; G01B 11/2545; G05D 1/0094
  USPC ......................................................... 348/148
  See application file for complete search history.

(56) References Cited

U.S. PATENT DOCUMENTS

| | | | |
|---|---|---|---|
| 8,892,252 B1* | 11/2014 | Troy ........................ | G01S 17/06 700/258 |
| 9,131,224 B1* | 9/2015 | Freeman ............ | G01N 21/8851 |
| 9,262,788 B1* | 2/2016 | Freeman ................. | G01S 15/89 |
| 9,292,630 B1* | 3/2016 | Freeman ............... | G06T 1/0007 |
| 9,336,552 B1* | 5/2016 | Freeman ............... | H04N 13/271 |
| 9,482,524 B2 | 11/2016 | Metzler et al. | |
| 9,519,058 B1* | 12/2016 | Freeman ............... | G01S 7/4817 |
| 9,958,387 B1* | 5/2018 | Freeman ............... | H04N 13/275 |
| 9,959,608 B1* | 5/2018 | Freeman ............... | G06T 7/0002 |
| 10,013,708 B1* | 7/2018 | Freeman ............... | G06T 7/0002 |
| 2007/0204555 A1 | 9/2007 | Engelbart et al. | |
| 2014/0046589 A1* | 2/2014 | Metzler ................ | G01C 15/004 356/3.09 |
| 2014/0168420 A1 | 6/2014 | Naderhirn et al. | |
| 2014/0267627 A1* | 9/2014 | Freeman ................. | G01S 17/86 348/47 |
| 2014/0336928 A1 | 11/2014 | Scott | |
| 2014/0340487 A1* | 11/2014 | Gilliland .............. | H04N 13/167 348/48 |
| 2015/0212391 A1 | 7/2015 | Waibel et al. | |
| 2015/0220085 A1 | 8/2015 | Ohtomo et al. | |
| 2016/0133019 A1 | 5/2016 | Wagner et al. | |
| 2016/0335778 A1* | 11/2016 | Smits ........................ | G06T 7/20 |
| 2017/0067734 A1* | 3/2017 | Heidemann ........... | G01C 15/00 |
| 2017/0138732 A1* | 5/2017 | Pettersson .............. | G01C 11/00 |
| 2017/0351900 A1* | 12/2017 | Lee ....................... | H04N 5/2257 |
| 2018/0032088 A1* | 2/2018 | van Cruyningen .... | G06V 20/10 |
| 2018/0095478 A1* | 4/2018 | van Cruyningen ..... | G01S 19/14 |

FOREIGN PATENT DOCUMENTS

| | | |
|---|---|---|
| DE | 102011017564 | 10/2012 |
| DE | 102011017564 A1 | 10/2012 |
| EP | 2511656 | 10/2012 |
| EP | 2511656 A1 | 10/2012 |
| EP | 2787319 | 10/2014 |
| EP | 2787319 A1 | 10/2014 |
| EP | 2902744 | 8/2015 |
| EP | 2902744 A1 | 8/2015 |
| JP | H1151650 A | 2/1999 |
| JP | 2005265699 A | 9/2005 |
| JP | 2007532910 A | 11/2007 |
| JP | 2014513792 A | 6/2014 |
| JP | 2015058758 A | 3/2015 |
| JP | 2015194069 A | 11/2015 |
| JP | 2015206749 A | 11/2015 |
| JP | 2015022760 A | 3/2017 |
| WO | 2014027097 | 2/2014 |
| WO | WO 2014027097 A2 | 2/2014 |
| WO | 2014170060 | 10/2014 |
| WO | WO 2014170060 A1 | 10/2014 |
| WO | 2017044344 | 3/2017 |
| WO | WO 2017044344 A1 | 3/2017 |

OTHER PUBLICATIONS

Office Action in corresponding Japanese Patent Application No. 2018-555735 dated Jun. 3, 2020. 9 pages.

* cited by examiner

MOVING FLYING OBJECT FOR SCANNING AN OBJECT, AND SYSTEM FOR ANALYZING DAMAGE TO THE OBJECT

CROSS-REFERENCE TO RELATED APPLICATIONS

This application claims priority to PCT Application No. PCT/EP2017/058993, having a filing date of Apr. 13, 2017, based off of German Application No. 10 2016 206.982.9, having a filing date of Apr. 25, 2016, the entire contents both of which are hereby incorporated by reference.

FIELD OF TECHNOLOGY

The following relates to a moving flying object for scanning an object.

BACKGROUND

An inspection of technical objects which are difficult to access, for example aircraft fuselages or hulls or rotor blades of wind power plants, often proves to be very complicated. In the case of hulls, there is a need for a relatively long stay in a dock in the case of serious damage because a damage analysis often presupposes accurate knowledge of a damage geometry. In the case of wind power plants, camera-based drone systems have recently been used to visually inspect rotor blades. However, such a visual inspection is often not sufficiently accurate to detect or exclude damage with the required certainty. In case of doubt, the rotor blades generally need to be removed with great effort in order to accurately measure the damage geometry on the ground. Such removal is often very costly and also results in temporary outage of the wind power plant.

SUMMARY

An aspect relates to arrangements which can be used to capture a state of or damage to large objects, in particular, in a more accurate manner.

A first aspect of embodiments of the invention provides a moving flying object for scanning an object. The moving flying object comprises a helicopter drone on which a 3-D scanner is mounted via an actively rotatable joint. The 3-D scanner has at least one high-resolution camera for recording a multiplicity of overlapping images of the object from different recording positions and recording directions, with the result that a position and an orientation of the 3-D scanner relative to the object can be determined by comparing the images. The moving flying object according to embodiments of the invention also has a coordination device for controlling the 3-D scanner, the joint and the helicopter drone in a coordinated manner.

Another aspect of embodiments of the invention provides a system for analyzing damage to an object. This system has a moving flying object according to embodiments of the invention and an image processing module for generating a data representation of a surface profile of the object on the basis of the recorded images. The system also comprises an assessment device for checking the surface profile and for outputting a statement of damage on the basis of the check. The check can be carried out, for example, by comparing the surface profile with a predefined desired profile.

The use of a helicopter drone provided with a 3-D scanner is advantageous in so far as the drone is generally capable of hovering and can also fly backward or sideways. This allows accurate and complete scanning even of large objects, for example rotors of wind power plants, without complicated removal. As a result of the use of a 3-D scanner, surfaces of large objects can be measured very accurately and accurate geometrical models suitable for damage analysis can be created.

Advantageous embodiments and developments of the invention are stated in the dependent claims.

According to one advantageous embodiment, the 3-D scanner can be a mobile 3-D scanning system having a plurality of spatially offset cameras. 3-D scanning technology can be used, in particular, for handheld 3-D scanners, for example with white light/blue light/flashlight technology. Currently available mobile 3-D scanning systems can achieve a scanning accuracy of fractions of millimeters, for example approximately $\frac{1}{30}$ mm, even in the case of moderate movement fluctuations. Such mobile 3-D scanning systems allow accurate scans even when transported by a helicopter drone which is naturally subject to certain movement fluctuations as a result of gusts of wind.

The 3-D scanner can preferably have a projector for projecting structured light onto the object. The at least one camera can accordingly be designed to resolve light structures projected onto the object. The capture of light structures projected onto the object generally considerably improves capture of a three-dimensional surface profile.

According to one advantageous development of embodiments of the invention, the moving flying object may have a marking device for optically marking specific points of a surface of the object. Such a marking can be effected, for example, by spraying ink onto the object. Such markings can considerably improve capture of a three-dimensional surface profile, in particular at points with low inherent visual structuring.

In addition, the coordination device can be set up to determine a position and/or an orientation of the moving flying object relative to the object on the basis of the recorded images and, on the basis thereof, to transmit flight instructions to the helicopter drone, rotation instructions to the joint, scanning instructions to the 3-D scanner, recording instructions to the at least one camera and/or marking instructions to the marking device. In this manner, a position, an orientation and/or a preferred distance of the moving flying object and/or of the 3-D scanner relative to the object can be controlled and/or stabilized in an autonomous or semiautonomous manner by means of suitable flight instructions. In addition, the orientation of the 3-D scanner can be controlled and/or stabilized in an autonomous or semiautonomous manner by means of suitable rotation instructions for the joint. As a result, position fluctuations of the moving flying object, in particular, can be compensated for in a coordinated, autonomous or semiautonomous manner. Furthermore, parts of the object which have not yet been scanned can be identified, approached and scanned in an autonomous or semiautonomous manner. This facilitates scanning of moving objects, in particular.

Furthermore, the moving flying object may have a battery to be jointly used by the helicopter drone and the 3-D scanner. The joint use of the battery is advantageous in comparison with a use of separate batteries in so far as it is possible to avoid the situation in which a first battery is empty and the mission would thus be terminated if another battery still had energy reserves.

According to one advantageous embodiment of the system for analyzing damage, the image processing module can be set up to capture common image patterns in the overlapping region in different overlapping images, to assign the different images to one another with respect to the common image pattern, and to determine a surface profile across images on the basis of the images assigned to one another. A geometrical structure and/or texture of the object surface and/or a light structure projected onto the object can be captured, in particular, as image patterns. Such assignment and combination of different images in a manner true to the image pattern to form a surface profile across images is often also referred to as "stitching".

According to one advantageous development of embodiments of the invention, the system according to embodiments of the invention may have a simulation device for the purpose of simulating a static and/or dynamic behavior of the object on the basis of the surface profile. The assessment device can then be set up to compare the simulated behavior with a predefined desired behavior of the object and to output the statement of damage on the basis of the comparison result. In this case, the simulation can be carried out, for example, using a numerical finite element method. In particular, the simulation device can be set up to generate a volume model of the object on the basis of the surface profile and to simulate the behavior on the basis of the volume model. The surface profile can be automatically checked for its effects on a function of the object by means of the simulation. This considerably facilitates an automatic damage assessment.

BRIEF DESCRIPTION

Some of the embodiments will be described in detail, with references to the following Figures, wherein like designations denote like members, wherein.

DETAILED DESCRIPTION

Figure 1A:
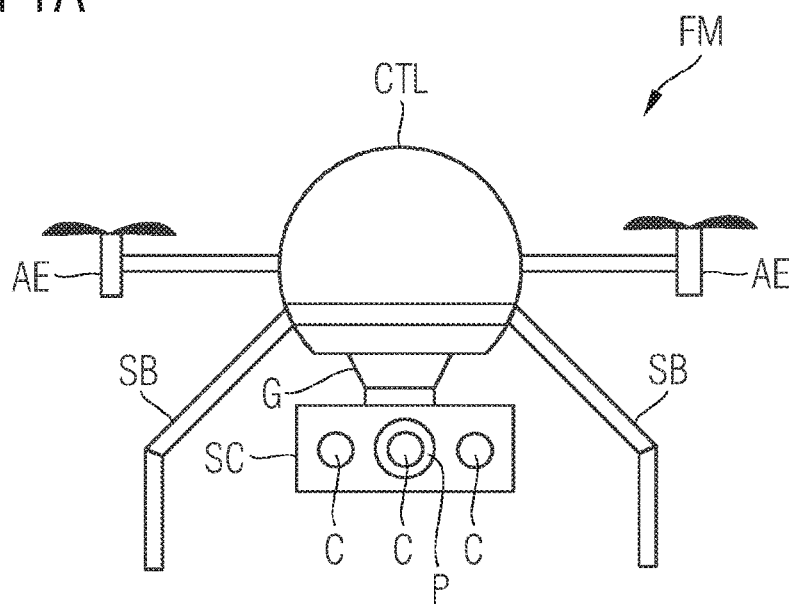
FIG. 1A shows a front view of a moving flying object according to embodiments of the invention.
Figure 1B:
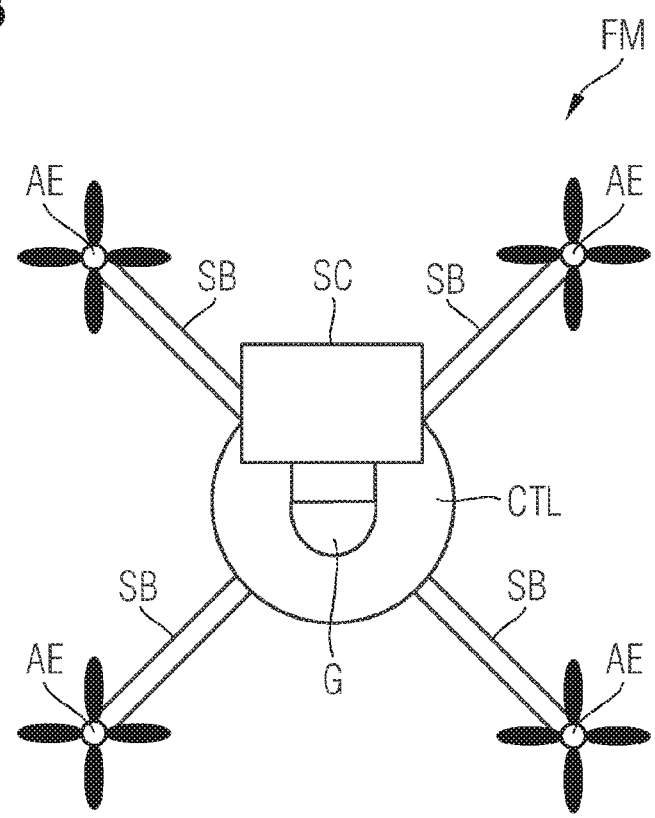
FIG. 1B shows a view of the moving flying object from below, in accordance with embodiments of the present invention.

FIGS. 1A and 1B each show a schematic illustration of a moving flying object FM according to embodiments of the invention for scanning an object. Whereas FIG. 1A shows a front view of the moving flying object FM, FIG. 1B illustrates a view of the same moving flying object FM from below.

The moving flying object FM comprises a helicopter drone which can be remotely controlled in an interactive manner and on which a 3-D scanner SC is mounted via an actively rotatable joint G. The helicopter drone has, by way of example, four uplift units AE each with an electric motor which drives a vertically acting propeller. Alternatively, it is also possible to use a helicopter drone having a different number of uplift units, for example a so-called octocopter drone having eight uplift units. The helicopter drone also has four support legs SB.

A mobile, high-precision 3-D scanning system, for example with white light/blue light/flashlight technology, is used as the 3-D scanner SC. Such mobile 3-D scanning systems have only recently been available and are often used in handheld 3-D scanners. The mobile 3-D scanning systems can achieve scanning accuracies of approximately 1/30 mm even in the case of moderate movement fluctuations, which is within the drawing tolerances of many components produced with high precision. In addition, mobile 3-D scanners may weigh less than one kilogram and their largest dimension may remain under 30 cm. Such a compact design enables transport by helicopter drone for the first time. The scanning distance of such 3-D scanners may reach approximately one meter, with the result that it is generally not difficult to avoid collisions between the moving flying object FM and an object to be scanned. A spatial offset of the helicopter drone as a result of gusts of wind can be corrected using contemporary mobile 3-D scanning technology since both geometrical and texture information relating to the scanned object and a projection of structured light can be used to merge scanning sections. A mobile 3-D scanner can output an accurate geometrical description of a surface of the scanned object in the form of a triangulation, for example in the so-called stl format.

The joint G has a horizontal axis of rotation and a vertical axis of rotation which can each be rotated using an electric motor. As a result, the 3-D scanner SC can be rotated both about the horizontal drone axis and about the vertical drone axis, with the result that the object can also be scanned from above by suitably controlling the joint G.

The 3-D scanner SC comprises a plurality of high-resolution cameras C (illustrated only in FIG. 1A). In the present exemplary embodiment, the 3-D scanner SC has three spatially offset, high-resolution cameras C having a different viewing direction for recording a multiplicity of overlapping images of the object to be scanned from different recording positions and recording directions. The cameras C have such a high resolution that a scanning accuracy of fractions of a millimeter, for example 1/30 mm, can be achieved, and a position and an orientation of the 3-D scanner SC relative to the surface of the object to be scanned are possible by identifying and comparing image patterns contained in different images.

In addition, the 3-D scanner SC has a projector P (illustrated only in FIG. 1A) for projecting structured light onto the object to be scanned. In the present exemplary embodiment, the projector P is annularly arranged around a central one of the three cameras C.

The moving flying object FM also has a controller CTL for controlling the moving flying object FM. The controller CTL is surrounded with a housing for protecting against precipitation and other weather effects.

Figure 2:
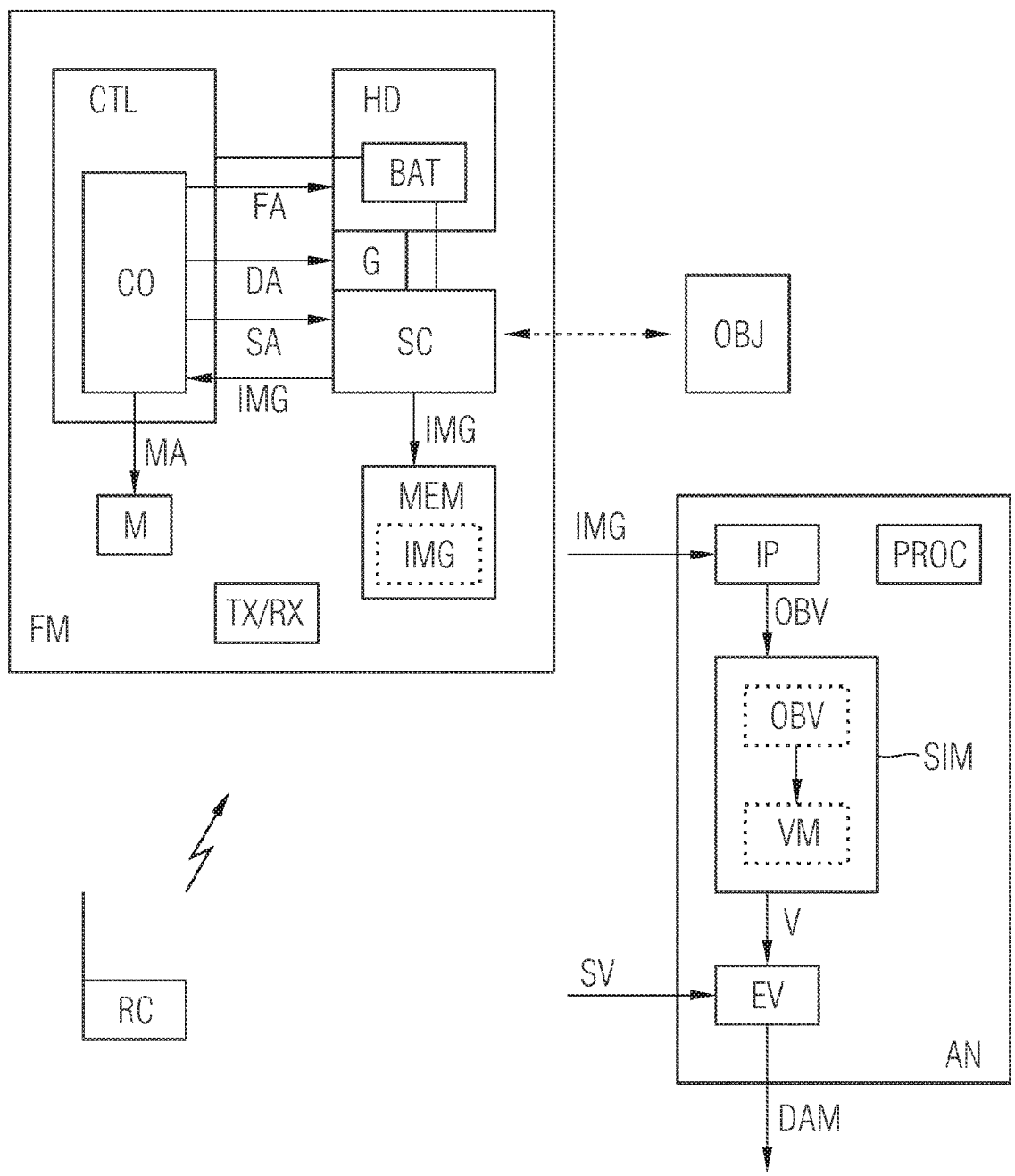
FIG. 2 shows a block diagram of a system for analyzing damage to an object, in accordance with embodiments of the present invention.

FIG. 2 shows a block diagram of a system according to embodiments of the invention for analyzing damage to an object OBJ. The system comprises a moving flying object FM according to embodiments of the invention, a remote control RC and an analysis device AN. The moving flying object FM is implemented as described in connection with FIGS. 1A and 1B and is used to scan and analyze the damage to the object OBJ. The object OBJ to be analyzed may be a rotor blade of a wind power plant, for example.

The moving flying object FM comprises a helicopter drone HD having a rechargeable battery BAT which supplies the drive of the helicopter drone with energy. As already stated above, a 3-D scanner SC is mounted on the helicopter drone HD via a joint G. The 3-D scanner SC and the joint G are implemented as described in connection with FIGS. 1A and 1B.

The moving flying object FM also has a marking device M, a memory MEM, a wireless transceiving device TX/RX and a controller CTL. The 3-D scanner SC and the controller CTL are also supplied with energy by the battery BAT. The joint use of the battery BAT is advantageous in comparison with a use of separate batteries in so far as it is possible to avoid the situation in which a first battery is empty and the mission is thus terminated if another battery still has energy reserves. This applies, in particular, since the helicopter drone HD and the 3-D scanner SC often each have a greatly fluctuating energy requirement independently of one another.

As indicated in FIG. 2 by means of a dotted double-headed arrow, the 3-D scanner SC projects structured light onto the object OBJ to be analyzed and, during this, records a multiplicity of overlapping high-resolution images IMG of the object OBJ from different recording positions and recording directions by means of the cameras C. In particular, the images IMG are recorded in a spatially and temporally offset manner. The recorded images IMG are initially stored by the 3-D scanner SC in the memory MEM in order to reduce a bandwidth required for radio communication with the remote control RC or possibly with the analysis device AN.

The marking device M is used to optically mark specific points of a surface of the object OBJ. Markings can be applied, for example by spraying on ink, at specifically predefined and/or exposed points of a surface of the object OBJ and/or at points with low visual structuring, for example.

The transceiving device TX/RX is used to remotely control the moving flying object FM and to transmit recorded images. The high-resolution images IMG recorded by the 3-D scanner SC are preferably transmitted with a reduced resolution or lower-resolution images from a camera provided for this purpose are transmitted in order to reduce the required radio transmission bandwidth. The resolution of the images to be transmitted is preferably selected in such a manner that the moving flying object FM can still be safely remotely controlled by an operator of the moving flying object FM on the basis of the transmitted images.

The remote control RC is accordingly used for interactive remote control of the moving flying object FM by the operator and to receive and display the transmitted images.

The controller CTL comprises a coordination device CO for controlling the 3-D scanner SC, the joint G, the helicopter drone HD and the marking device M in a coordinated manner. The coordination is carried out, in particular, on the basis of the recorded images IMG which are transmitted from the 3-D scanner SC to the coordination device CO for this purpose. On the basis of the recorded images IMG, the coordination device CO determines the position and orientation of the moving flying object FM relative to the object OBJ. On the basis of this, the coordination device CO then transmits flight instructions FA to the helicopter drone HD, specific rotation instructions for the axes of rotation of the joint G to the joint G, scanning instructions SA to the 3-D scanner SC and/or marking instructions MA to the marking device M in a coordinated manner. In this case, the scanning instructions SA may comprise recording instructions for a respective camera C.

The analysis device AN evaluates the recorded high-resolution images IMG in order to carry out a damage analysis. The analysis device AN can be implemented as a separate system or may be completely or partially integrated in the moving flying object FM or the remote control RC. The analysis device AN comprises one or more processors PROC for carrying out all analysis steps.

In order to carry out the damage analysis, the recorded high-resolution images IMG are read from the memory MEM and are transmitted to an image processing module IP of the analysis device AN. The image processing module IP generates a data representation of a surface profile OBV of the scanned object OBJ on the basis of the recorded images IMG. The data representation preferably describes a profile of a two-dimensional surface of the object OBJ in three-dimensional space, for example in the form of a triangulation. Such a triangulation can be represented in the so-called stl format, in particular.

In order to generate the surface profile OBV, the image processing module IP attempts to identify and capture common image patterns in the overlapping region in different images of the overlapping images IMG using a pattern recognition method. Geometrical structures and/or textures of the object surface and/or a light structure projected onto the object OBJ or markings applied thereto can be captured in this case as image patterns. If a common image pattern is identified in different images, these images can be assigned to one another with respect to the common image pattern, with the result that the image patterns of these images are imaged onto one another with imaging fidelity. A surface profile across images can then be determined on the basis of the images assigned to one another. Such assignment and combination of different images with imaging fidelity or in a manner true to the image pattern to form a surface profile across images is often also referred to as "stitching".

The position and orientation of the 3-D scanner SC relative to the object OBJ can also be determined on the basis of the images assigned to one another.

The image processing module IP can be separately integrated in the moving flying object FM or in the 3-D scanner SC independently of other components of the analysis device AN. This allows preprocessing of the high-resolution images IMG in the moving flying object FM or in the 3-D scanner SC.

The image processing module IP transmits the generated data representation of the surface profile OBV to a simulation device SIM for simulating a static or dynamic behavior V of the object OBJ on the basis of the surface profile OBV. In this case, the simulation device SIM first of all generates a volume model VM of the object OBJ on the basis of the surface profile OBV and finally simulates the behavior V on the basis of the volume model VM. The structure and fluid-mechanical effects of damage and therefore a severity of the damage can be automatically assessed using the simulation.

The simulated behavior V is transmitted, in the form of a suitable data representation, from the simulation module SIM to an assessment device EV of the analysis device AN. Furthermore, a predefined desired behavior SV of the object OBJ is read in by the assessment device EV. The latter then compares the simulated behavior V with the predefined desired behavior SV and outputs a statement of damage DAM on the basis of the comparison result. In this case, it is possible to predefine a distance dimension for a discrepancy between the desired behavior SV and the simulated behavior V, which distance dimension is compared with a threshold value. If the threshold value is exceeded, existing or imminent damage can then be indicated by means of a corresponding statement of damage DAM. On the basis of this, it is possible to decide whether or not an affected component should be replaced.

The surface profile OBV is checked with respect to its effects on a function of the object OBJ by means of the simulation and the comparison of the simulated behavior V with the desired behavior SV. Alternatively or additionally, the surface profile OBV can also be directly compared with a predefined desired profile in order to output the statement of damage DAM on the basis thereof.

The embodiment makes it possible to inspect even components which are difficult to access, those of for example wind power plants, ships or aircraft, in situ without complicated removal. On account of the simulation of the effects of visible damage, it is immediately possible to decide in many cases whether or not damage is acceptable.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A system for analyzing damage comprising:
   a) a helicopter drone for scanning an object;
   b) a three-dimension (3-D) scanner which is mounted on the helicopter drone via an actively rotatable joint and has at least one high-resolution camera for recording a multiplicity of overlapping images of the object from different recording positions and recording directions, with a result that a position and an orientation of the 3-D scanner relative to the object is determined by comparing the multiplicity of overlapping images wherein the 3-D scanner has a projector for projecting structured light onto the object and the at least one high-resolution camera is designed to resolve light structures projected onto the object;
   c) a coordination device for controlling the 3-D scanner the actively rotatable joint and the helicopter drone in a coordinated manner, wherein the coordination device is set up to determine a position and/or an orientation of the moving flying object relative to the object on the basis of the recorded images and, on the basis thereof, to transmit flight instructions to the helicopter drone rotation instructions to the actively rotatable joint scanning instructions to the 3-D scanner and/or recording instructions to the at least one camera;
   d) an image processing module for generating a data representation of a surface profile of the object on the basis of the recorded images;
   e) an assessment device for checking the surface profile and for outputting a statement of damage on the basis of the check; and
   f) a simulation device for simulating a static and/or dynamic behavior of the object on the basis of the surface profile to determine an effect on a function of the object, and in that the assessment device is set up to compare the simulated behavior with a predefined desired behavior of the object and to output the statement of damage on the basis of the comparison result.

2. The system for analyzing damage as claimed in claim 1, wherein the 3-D scanner is a mobile 3-D scanning system having a plurality of spatially offset cameras.

3. The system for analyzing damage as claimed in claim 1, further comprising a marking device for optically marking specific points of a surface of the object.

4. The system for analyzing damage as claimed in claim 1, further comprising a battery to be jointly used by the helicopter drone and the 3-D scanner.

5. The system for analyzing damage as claimed in claim 1, wherein the image processing module is set up to capture common image patterns in the overlapping region in different overlapping images to assign the different images to one another with respect to the common image pattern, and to determine a surface profile across images on the basis of the images assigned to one another.

6. The system for analyzing damage as claimed in claim 5, wherein the image processing module is set up to capture a geometrical structure and/or texture of the object surface and/or a light structure projected onto the object as image patterns.

7. The system for analyzing damage as claimed in claim 1, wherein the simulation device is set up to generate a volume model of the object on the basis of the surface profile and to simulate the behavior on the basis of the volume model.

* * * * *